US008908355B2

(12) United States Patent
Martin et al.

(10) Patent No.: US 8,908,355 B2
(45) Date of Patent: Dec. 9, 2014

(54) EMERGENCY LIGHTING CONTROL PANEL (75) Inventors: Heath L. Martin, Gallatin, TN (US); Scott Jordan, Murfreesboro, TN (US); John W. Dyer, Ashland City, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 282 days.

(21) Appl. No.: 13/605,847

(22) Filed: Sep. 6, 2012

(65) Prior Publication Data

US 2014/0063695 A1    Mar. 6, 2014

(51) Int. Cl.
*H02B 1/04* (2006.01)
*H02B 1/20* (2006.01)

(52) U.S. Cl.
USPC ........... 361/634; 361/633; 361/641; 361/644; 361/650; 361/655; 361/658

(58) Field of Classification Search
USPC ......... 361/627, 633–634, 636, 641, 644, 647, 361/650, 652, 655–656, 658
See application file for complete search history.

(56) References Cited

U.S. PATENT DOCUMENTS 3,225,264 A * 12/1965 Weiss ............................ 361/826
5,023,404 A *  6/1991 Hudson et al. ................. 174/97
5,184,278 A *  2/1993 Jordan et al. .................. 361/627
6,320,732 B1 * 11/2001 Norman et al. ................. 361/62
7,566,986 B2 *  7/2009 DeBoer et al. ................ 307/31
7,692,112 B2 *  4/2010 Deboer et al. ................ 200/331
7,782,596 B2 *  8/2010 Ross ............................. 361/648
7,889,476 B2 *  2/2011 King, Jr. ....................... 361/160
7,907,388 B2 *  3/2011 DeBoer et al. ............... 361/628
8,279,574 B2 * 10/2012 Scoggins et al. ............. 361/115
2010/0072896 A1 *  3/2010 Mennes et al. ................ 315/86

OTHER PUBLICATIONS

Lighting Integrator Panel With Emergency Relay Option, Installation and Operation Addendum, WattStopper/Legrand, 2009 (2 pages).
Lighting Integrator Emergency Relay Panel Option, Wattstopper, 2009 (1 page).

* cited by examiner

*Primary Examiner* — Robert J Hoffberg
(74) *Attorney, Agent, or Firm* — Locke Lord LLP (57) ABSTRACT

A combination emergency panelboard includes a relay section and a circuit-breaker section. The relay section includes automatic load control relays and the circuit-breaker section includes emergency circuit breakers. A dielectric barrier is positioned between the relay and circuit-breaker sections to separate them. A busbar is positioned in the circuit-breaker section for distributing a phase of emergency current to a plurality of emergency circuit breakers coupled thereto. A plurality of automatic load control relays is positioned in the relay section. Each of the relays is electrically connected to a respective one of the plurality of emergency circuit breakers for distributing the phase of emergency current to a respective load.

20 Claims, 10 Drawing Sheets

EMERGENCY LIGHTING CONTROL PANEL

FIELD OF THE INVENTION

The present invention relates generally to electrical equipment and, more particularly, to emergency lighting electrical enclosures having automatic load control relays therein.

BACKGROUND OF THE INVENTION

Electrical enclosures, such as, for example, load centers or panelboards, typically house multiple circuit breakers and/or related electrical accessories for distributing one or more phases of power (e.g., utility power or emergency power) to a plurality of loads (e.g., non-emergency lighting fixtures, emergency lighting fixtures). Automatic load control relays (UL 924 relays) or shunts can be used in emergency lighting schemes or solutions to monitor utility or normal power in a building and automatically turn emergency lighting fixtures on using emergency power from an emergency power panelboard when utility power from a utility power panelboard is interrupted (e.g., power outage).

Regulations restrict the mixing of utility and emergency power in the same location. And, each relay requires connections to emergency power for distributing the same to emergency fixtures in the building, and connections to utility power for monitoring the same. In common practice, the automatic load control relays are typically housed in individual junction boxes adjacent to or in the space including the emergency fixtures being controlled by the relay. Each utility power wire and emergency power wire—for connecting the relays to the respective power sources (e.g., emergency and utility)—are run separately to the remotely located relays. While such a practice works, it requires a vast amount of wires to be run from the electrical closest in the building—which houses the emergency power panelboard and the utility power panelboard—to each location including a relay and associated emergency fixtures. In some large scale buildings (e.g., 4 floors, 10 floors, 100 floors, etc.), such solutions can include hundreds or even thousands of relays requiring an extraordinary amount of wires throughout the building just to implement the emergency lighting scheme or solution.

Thus, a need exists for an improved apparatus and system. The present invention is directed to satisfying one or more of these needs and solving other problems.

The Background of the Invention Section above is provided to place embodiments of the present disclosure in technological and operational context, to assist those of skill in the art in understanding their scope and utility. Unless explicitly identified as such, no statement herein is admitted to be prior art merely by its inclusion in the Background of the Invention Section.

SUMMARY OF THE INVENTION

The present disclosure is directed to an emergency relay electrical enclosure and an emergency panelboard. The emergency relay electrical enclosure includes a plurality of automatic load control relays (e.g., UL 924 relays) for distributing emergency power to a plurality of emergency loads (e.g., emergency lighting fixtures) and for monitoring utility power. The emergency panelboard includes the emergency relay electrical enclosure in combination with an emergency power panelboard that includes a plurality of emergency circuit breakers for distributing the emergency power to the relays in the emergency relay electrical enclosure. The emergency power panelboard can be coupled to a transfer switch that can supply the emergency circuit breakers in the emergency power panelboard with power from a utility or power from an emergency backup source, such as, for example, an emergency generator or emergency batteries.

The plurality of automatic load control relays is arranged in the emergency relay electrical enclosure in one or more columns. Wire barriers are positioned at the ends of the columns of relays and between the columns of relays (when two or more columns are present). The wire barriers are designed to work with the bodies or housings of the relays themselves to form channels on both sides of the columns for wires to be run and connected with the relays. On one side of each column of relays is an emergency wire channel for emergency power wires to be run and connected to emergency contacts on the relays and on the other side of each column of relays is a utility wire channel for utility power wires to be run and connected to utility contacts on the relays. Thus, the emergency and utility wire channels—formed by the wire barriers and the columns of relays themselves—aid in keeping the emergency power wires and the utility power wires separate within the emergency relay electrical enclosure as required by the regulations.

In addition to the wire barriers and the columns of relays forming the wire channels, a cover of the emergency relay electrical enclosure further aids in forming the wire channels by capping and/or sealing the emergency and utility power wires therein. As the cover is coupled to a housing of the emergency relay electrical enclosure, an inner surface of the cover abuts the wire barriers and portions of the relays therein, thereby preventing the emergency power wires from migrating into the utility wire channel(s) and preventing the utility power wires from migrating into the emergency wire channel(s).

By including an emergency relay electrical enclosure and an emergency power panelboard in one package or housing, the combination can be supplied/sold and rated as a single emergency panelboard with a SCCR (short circuit current rating) for the overall emergency panelboard prior to being installed in a building for use in, for example, an emergency power scheme. The SCCR rating of the emergency panelboard (including the emergency relay electrical enclosure and the emergency power panelboard) disposes of a lot of regulatory/code issues for installers that previously had to install the individually rated emergency relays separately from the individually rated emergency power panelboards providing immense regulatory relief for the designer/installer. Further, the combination emergency panelboard (including the emergency relay electrical enclosure and the emergency power panelboard) allows for faster installations of branch wiring for emergency lighting fixtures, is supplied as a single code compliant unit, is supplied with a single UL rating, and eliminates excess wire runs.

The foregoing and additional aspects and implementations of the present disclosure will be apparent to those of ordinary skill in the art in view of the detailed description of various implementations and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
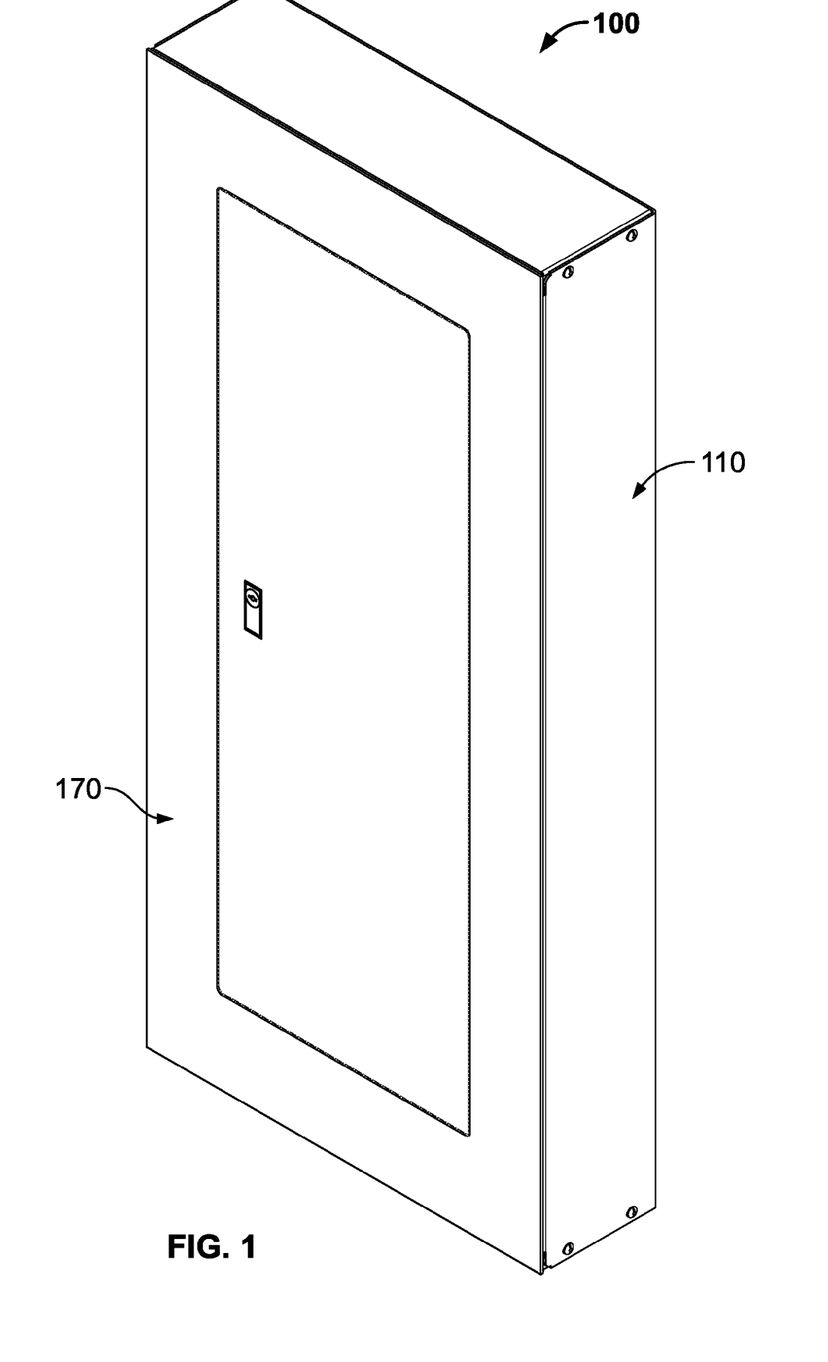
FIG. 1 is a perspective view of an emergency relay electrical enclosure according to some aspects of the present disclosure.
Figure 2:
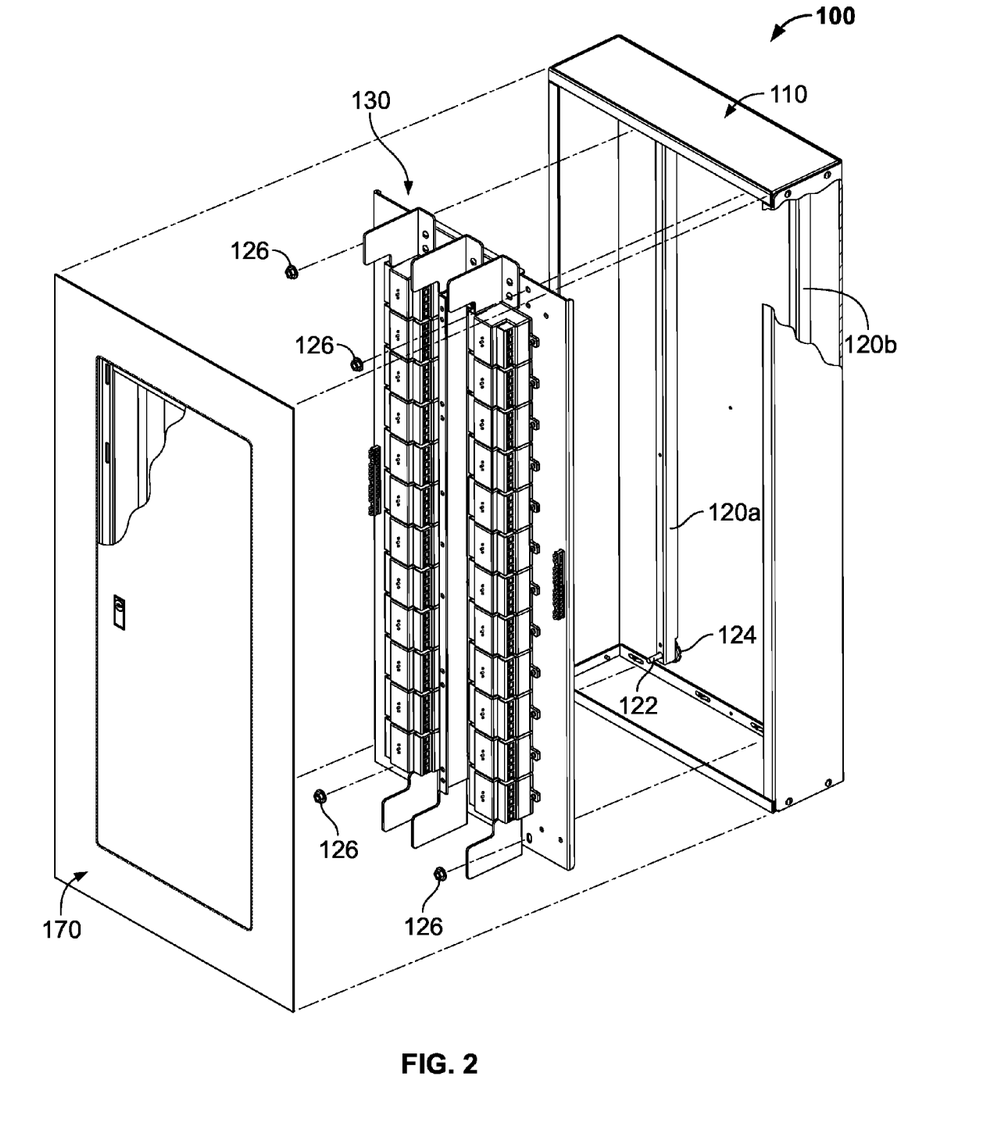
FIG. 2 is a partially exploded perspective view of the emergency relay electrical enclosure of FIG. 1.

Referring to FIG. 1, an emergency relay electrical enclosure 100 is shown in the assembled configuration according to the present disclosure. A partially exploded view of the emergency relay electrical enclosure 100 is shown in FIG. 2. Generally, the emergency relay electrical enclosure 100 includes a housing or housing assembly 110, a relay pan assembly 130, and a cover or cover assembly 170. In the assembled configuration (FIG. 1), the relay pan assembly 130 (FIG. 2) is received in and coupled to the housing assembly 110. Further, the cover assembly 170 is coupled to the relay pan assembly 130 such that a portion of the cover assembly 170 abuts the housing assembly 110 and seals the contents of the relay pan assembly 130 therein.

Figure 3:
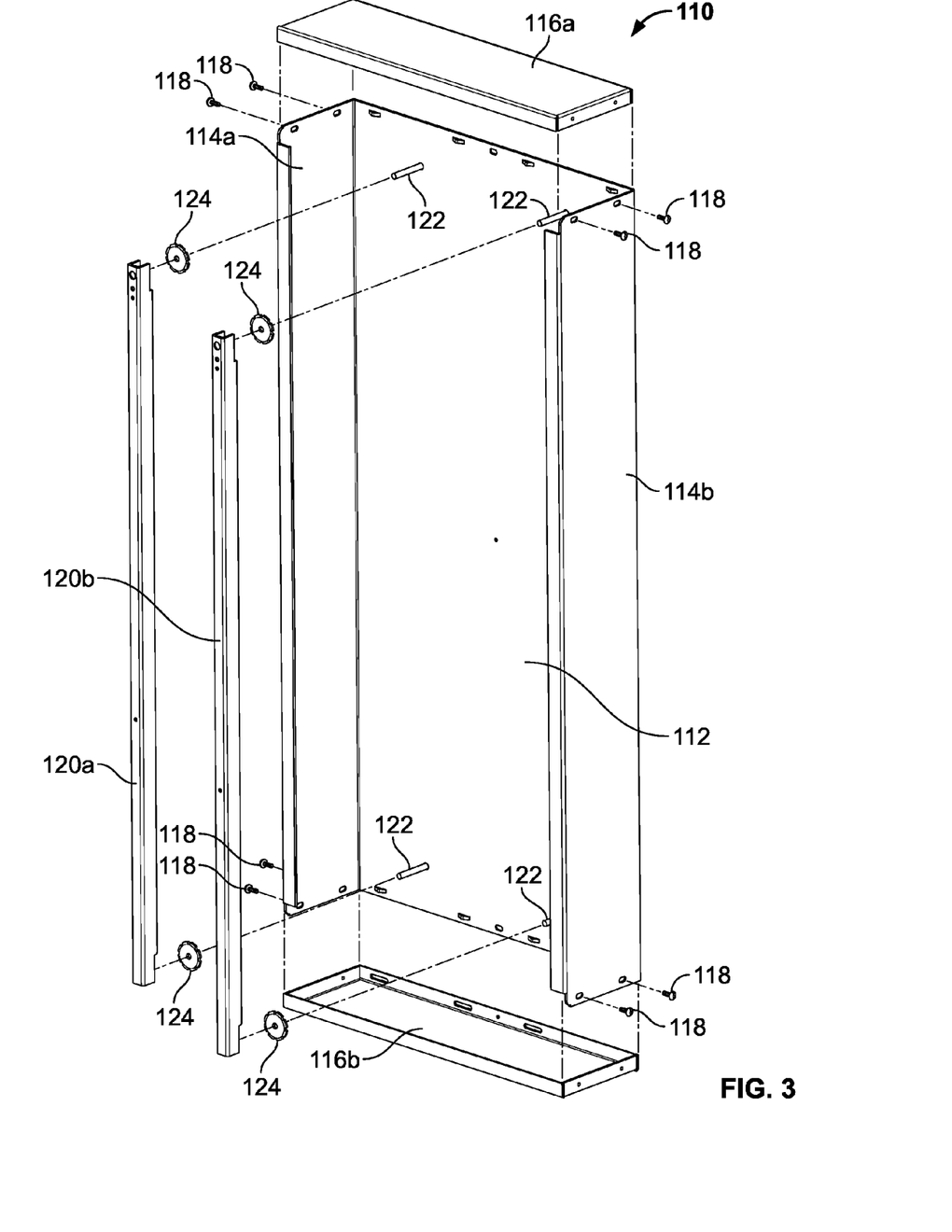
FIG. 3 is an exploded perspective view of the housing assembly of the emergency relay electrical enclosure of FIGS. 1 and 2.

As best shown in FIG. 3, the housing assembly 110 includes a base 112, two side panels 114a,b, two end panels 116a,b, and two pan mounting rails 120a,b. The two side panels 114a,b are integral with the base 112. The two end panels 116a,b are attached to the two side panels 114a,b and/or the base 112 via one or more fasteners 118. Each of the pan mounting rails 120a,b is coupled to the base 112 via two pan bolts 122 that protrude through respective apertures in the base 112 (as shown in FIG. 2). On each of the pan bolts 122—between the pan mounting rails 120a,b and the base 112—is an adjustable wheel 124 (FIG. 3). The adjustable wheels 124 can be rotated clockwise or counterclockwise to screw or unscrew the adjustable wheels 124 along their respective pan bolt 122, thereby adjusting the distance between the pan mounting rails 120a,b and the base 112.

Such adjustment of the pan mounting rails 120a,b automatically adjusts the orientation of the relay pan assembly 130 when coupled to the housing assembly 110. Specifically, the relay pan assembly 130 is mounted on the pan mounting rails 120a,b such that the pan bolts 122 protrude through respective apertures in the relay pan assembly 130 and respective pan nuts 126 (shown in FIG. 2) hold the relay pan assembly 130 thereon. As the pan nuts 126 are tightened, the pan mounting rails 120a,b are sandwiched between the relay pan assembly 130 and the adjustable wheels 124. Thus, depending on the location of each of the adjustable wheels 124 on the pan bolts 122, the orientation of the relay pan assembly 130 is automatically set/adjusted so that wire channels (e.g., wire channels 160a,b and 162a,b) can be/remain reliably "closed" when set in relation to the cover assembly 170 as further explained below.

Figure 4A:
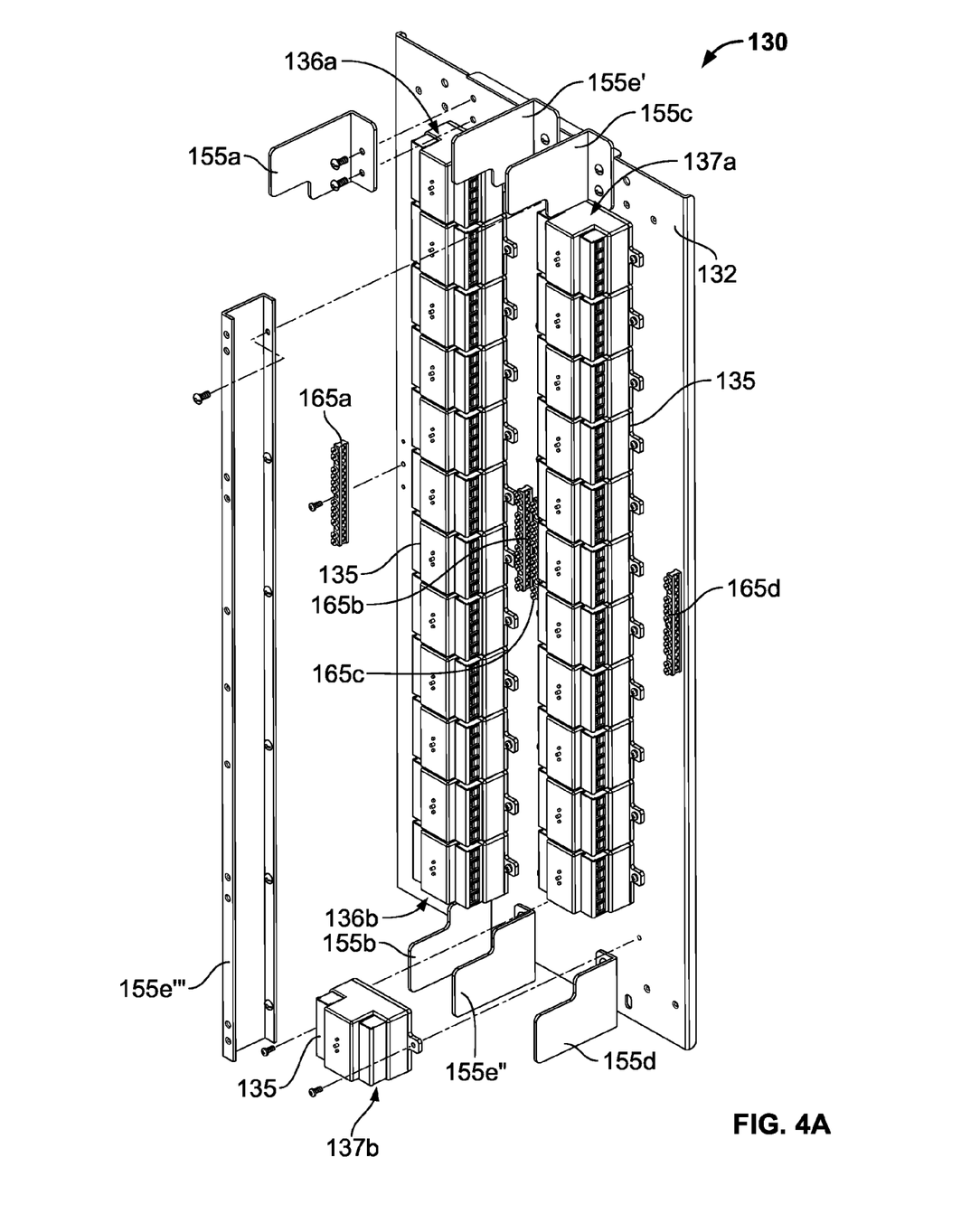
FIG. 4A is a partially exploded perspective view of the relay pan assembly of the emergency relay electrical enclosure of FIGS. 1 and 2.
Figure 4B:
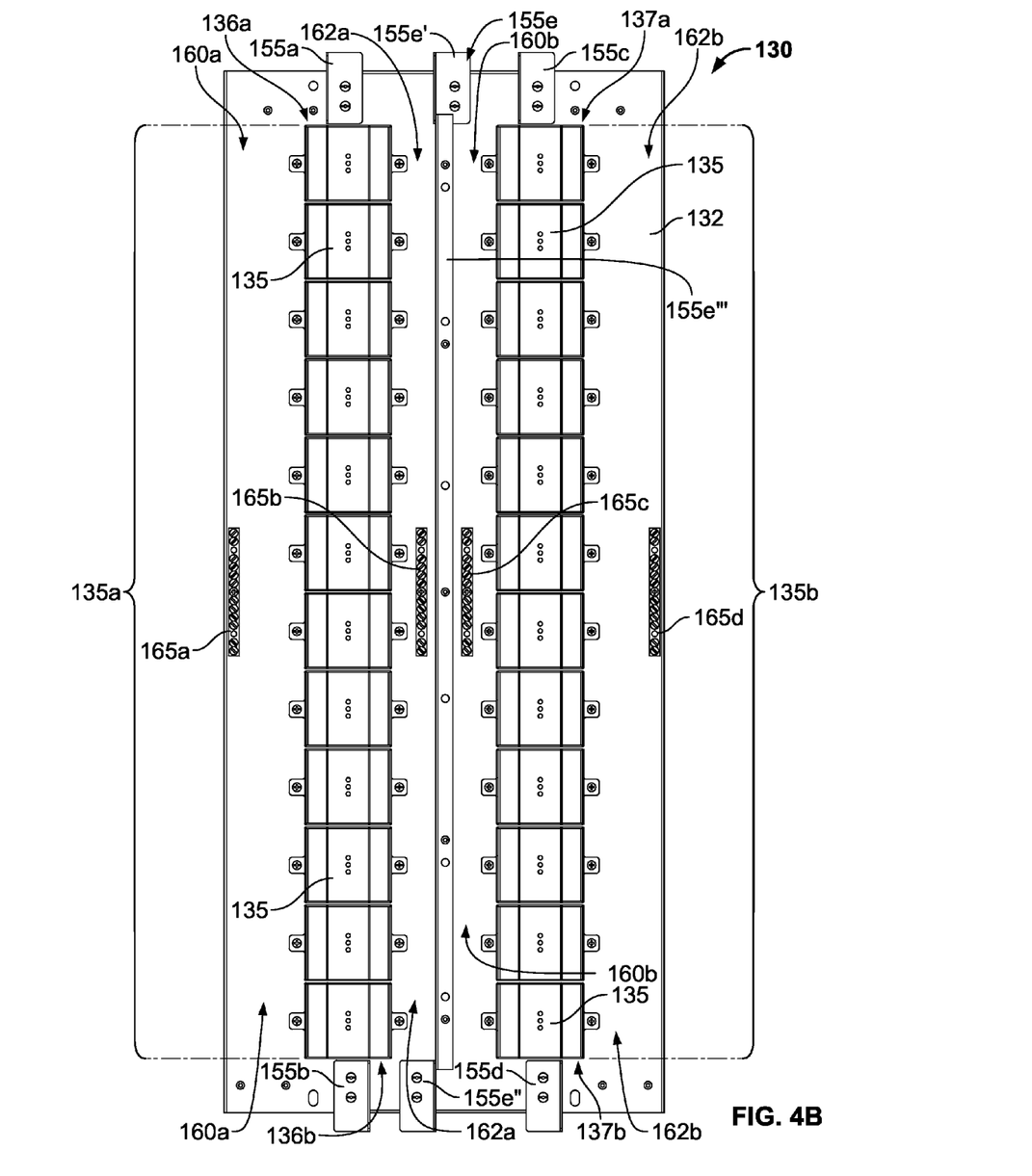
FIG. 4B is a front view of the relay pan assembly of FIG. 4A.

Referring to FIGS. 4A and 4B, the relay pan assembly 130 includes a relay mounting pan 132, a first column of automatic load control relays 135a (referred to as a first column of relays) (FIG. 4B), a second column of automatic load control relays 135b (referred to as a second column of relays) (FIG. 4B), a plurality of wire barriers 155a-e, and optionally a plurality of grounding bars 165a-d. The relay mounting pan 132 is coupled to the housing assembly 110 via the pan bolts 122 and the pan nuts 126 (shown in FIG. 2). The relay mounting pan 132 includes a plurality of attachment points and/or apertures for receiving fasteners (e.g., screws, nuts and bolts, rivets, welds, glue, etc.) to attach various components (e.g., relays, wire barriers, grounding bars, etc.) thereto. The relay mounting pan 132 can include a layer and/or coating of electrically insulating material (e.g., powder coated white).

The first column relays 135a is attached to the relay mounting pan 132 such that a top end and/or a bottom end of each relay 135 in the first column of relays 135a abuts or is in close proximity to a top end and/or a bottom end of adjacent ones of the relays 135 in the first column of relays 135a. Similarly, the second column relays 135b is attached to the relay mounting pan 132 such that a top end and/or a bottom end of each relay 135 in the second column of relays 135b abuts or is in close proximity to a top end and/or a bottom end of adjacent ones of the relays 135 in the second column of relays 135b. By the phrase "abuts or is in close proximity" it is generally meant that the relays 135 in each of the columns of relays 135a,b are attached to the relay mounting pan 132 such that the space between each of the relays 135 is small enough such that a typical electrical wire connected to one of the relays 135 cannot easily fit therebetween.

Figure 4C:
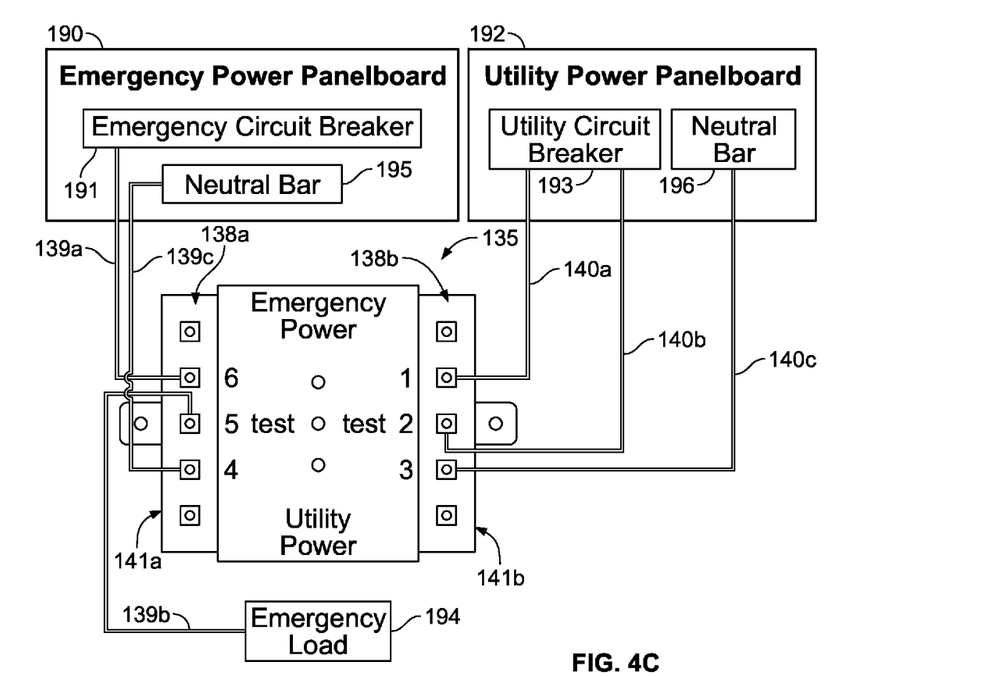
FIG. 4C is a diagram of a relay of the relay pan assembly of FIG. 4A connected with an emergency power panelboard, a utility power panelboard, and an emergency load according to some aspects of the present disclosure.

As best shown in the exemplary enlarged view of a first one of the relays 135 of the first column of relays 135a in FIG. 4C, each of the relays 135 includes emergency-wire connectors 138a for attaching emergency power wires 139a,b,c thereto and utility-wire connectors 138b for attaching utility power wires 140a,b,c thereto. The emergency-wire connectors 138a are positioned on a first side 141a of each of the relays 135 and the utility-wire connectors 138b are positioned on a second opposing side 141b of each of the relays 135, thereby physically separating the emergency power wires 139a,b,c from the utility power wires 140a,b,c.

As diagrammatically shown in FIG. 4C, each of the relays 135 can be electrically connected to (i) a respective emergency circuit breaker 191 in an emergency power panelboard 190 via the emergency-wire connectors 138a and the emergency power wires 139a,b,c for distributing one or more phases of emergency current to one or more respective emergency loads 194 (e.g., one or more emergency lighting fixtures) and (ii) a respective utility circuit breaker 193 in a utility power panelboard 192 via the utility-wire connectors 138*b* and the utility power wires 140*a,b,c* for monitoring a voltage of the respective utility circuit breaker.

Specifically, the first emergency power wire 139*a* can be electrically connected between a first one of the emergency-wire connectors 138*a* of the first relay 135 (FIG. 4C) and an output lug of the emergency circuit breaker 191 in the emergency power panelboard 190; the second emergency power wire 139*b* can be electrically connected between a second one of the emergency-wire connectors 138*a* of the first relay 135 and an input lug of a first emergency lighting fixture; and the third emergency power wire 139*c* can be electrically connected between a third one of the emergency-wire connectors 138*a* of the first relay 135 and a neutral bar 195 in the emergency power panelboard 190.

Further, the first utility power wire 140*a* can be electrically connected between a first one of the utility-wire connectors 138*b* of the first relay 135 (FIG. 4C) and a constant hot output lug of the utility circuit breaker 193 in the utility power panelboard 192; the second utility power wire 140*b* can be electrically connected between a second one of the utility-wire connectors 138*b* of the first relay 135 and a switched output lug of the first utility circuit breaker 193; and the third utility power wire 140*c* can be electrically connected between a third one of the utility-wire connectors 138*b* of the first relay 135 and a neutral bar 196 in the utility power panelboard 192. While not shown, each of the utility circuit breakers 193 in the utility power panelboard 192 can further be connected to respective utility load (e.g., non-emergency lighting fixtures) for supplying utility power thereto under normal operating conditions (e.g., not during an emergency event).

Each of the relays 135 is selectively controllable to either supply or not supply the one or more phases of emergency current to its respective emergency load (e.g., emergency lighting fixtures) during normal operating conditions (e.g., not during an emergency event). Specifically, a control wire (e.g., the second utility power wire 140*b* electrically connected to the second one of the utility-wire connectors 138*b*) is connected to one of the utility-wire connectors 138*b* of a respective one of the relays 135 for controlling the status (ON or OFF) of its respective the emergency load. The selective control of the relays 135 can be based on (i) the position of one or more wall mounted switches (e.g., a light switch), (ii) a timer, (iii) a schedule implemented by a processor and/or lighting controller (e.g., a PowerLink G3 Controller available from Schneider-Electric USA, Inc.), etc.

Each of the relays 135 is electrically connected to a utility circuit breaker (e.g., utility circuit breaker 193) for monitoring the voltage across the respective utility circuit breaker such that the relays 135 can determine if an emergency event has occurred. For example, when a power outage occurs and kills the delivery of utility current to the utility loads through the utility circuit breakers, an emergency event requiring emergency power occurs. In such a situation, the relays 135 monitoring the affected utility circuit breakers automatically supply emergency current from their respective emergency circuit breakers to their respective emergency loads. Further, when an emergency event occurs, the relays 135 automatically supply the emergency current to their respective emergency loads without regard to the selection to supply or not supply the one or more phases of emergency current. That is, the switchable function of the relay 135 is ignored or bypassed during the occurrence of an emergency event and emergency electricity is automatically supplied to the emergency loads.

Referring back to FIGS. 4A and 4B, a first one of the wire barriers 155*a* is attached to the relay mounting pan 132 adjacent to a first end 136*a* of the first column of relays 135*a* and a second one of the wire barriers 155*b* is attached to the relay mounting pan 132 adjacent to a second opposing end 136*b* of the first column of relays 135*a*. The first and the second wire barriers 155*a,b* in conjunction with the first column of relays 135*a* form a first emergency wire channel 160*a* and a first utility wire channel 162*a* (shown in FIG. 4B). Specifically, the first emergency wire channel 160*a* is formed along a first side (e.g., left side) of the first and second wire barriers 155*a,b* and the first column of relays 135*a* and the first utility wire channel 162*a* is formed along a second opposing side (e.g., rights side) of the first and second wire barriers 155*a,b* and the first column of relays 135*a*.

The first wire barrier 155*a* extends between the first end 136*a* of the first column of relays 135*a* to a first one of the end panels 116*a* of the housing assembly 110. Similarly, the second wire barrier 155*b* extends between the second opposing end 136*b* of the first column of relays 135*a* to a second one of the end panels 116*b* of the housing assembly 110. The extension of the first and second wire barriers 155*a,b* to the end panels 116*a,b* aids in preventing wires positioned within the first emergency wire channel 160*a* from migrating or moving into the first utility wire channel 162*a* and vice versa, thereby maintaining separation of emergency and utility power sources as required by the regulations.

As best shown in FIG. 4B, a third one of the wire barriers 155*c* is attached to the relay mounting pan 132 adjacent to a first end 137*a* of the second column of relays 135*b* and a fourth one of the wire barriers 155*d* is attached to the relay mounting pan 132 adjacent to a second opposing end 137*b* of the second column of relays 135*b*. The third and the fourth wire barriers 155*c,d* in conjunction with the second column of relays 135*b* form a second emergency wire channel 160*b* and a second utility wire channel 162*b*. Specifically, the second emergency wire channel 160*b* is formed along a first side (e.g., left side) of the third and fourth wire barriers 155*c,d* and the second column of relays 135*b* and the second utility wire channel 162*b* is formed along a second opposing side (e.g., rights side) of the third and fourth wire barriers 155*c,d* and the second column of relays 135*b*.

The third wire barrier 155*c* extends between the first end 137*a* of the second column of relays 135*b* to the first one of the end panels 116*a* of the housing assembly 110. Similarly, the fourth wire barrier 155*d* extends between the second opposing end 137*b* of the second column of relays 135*b* to the second one of the end panels 116*b* of the housing assembly 110. The extension of the third and fourth wire barriers 155*c,d* to the end panels 116*a,b* aids in preventing wires positioned within the second emergency wire channel 160*b* from migrating or moving into the second utility wire channel 162*b* and vice versa, thereby maintaining separation of emergency and utility power sources.

To separate the first utility wire channel 162*a* from the second emergency wire channel 160*b* (thereby maintaining separation of emergency and utility power sources), the fifth wire barrier 155*e* (FIG. 4B) is attached to the relay mounting pan 132 between the first and the second columns of relays 135*a,b*. The fifth wire barrier 155*e* can include three elements 155*e'*, 155*e"*, and 155*e'''* (best shown in FIG. 4A) that are separately attached to the relay mounting pan 132 to form the assembled fifth wire barrier 155*e* (best shown in FIG. 4B). For example, the fifth wire barrier 155*e* can include two fin portions 155e' and 155e" and a beam portion 155e''' connected therebetween. The two fin portions 155e' and 155e" are the same as, or similar to, the first, the second, the third, and the fourth wire barriers 155a-d. The beam portion 155e''' includes apertures for attaching the beam portion 155e''' to the relay mounting pan 132 and for attaching the cover assembly 110 to the beam portion 155e' using one or more fasteners. Alternatively, the fifth wire barrier 155e can be formed as one contiguous part that is attached to the relay mounting pan 132 (not shown).

The wire barriers 155a-e can be made of any material, such as, for example, cold-rolled steel, aluminum, or any other metal, plastic, or any combination thereof. In some implementations, the wire barriers 155a-e include a cold-rolled steel base or frame with an insulating layer attached thereto (e.g., powder coated white).

Optionally, as best shown in FIG. 4B, each of the grounding bars 165a-d is positioned in a respective one of the wire channels 160a,b and 162a,b. Specifically, a first one of the grounding bars 165a is attached to the relay mounting pan 132 in the first emergency wire channel 160a, a second one of the grounding bars 165b is attached to the relay mounting pan 132 in the first utility wire channel 162a, a third one of the grounding bars 165c is attached to the relay mounting pan 132 in the second emergency wire channel 160b, and a fourth one of the grounding bars 165d is attached to the relay mounting pan 132 in the second utility wire channel 162b. Each of the grounding bars 165a-d includes a plurality of grounding-wire attachment points for commonly grounding various electrical components within the emergency relay electrical enclosure 100.

Figure 5:
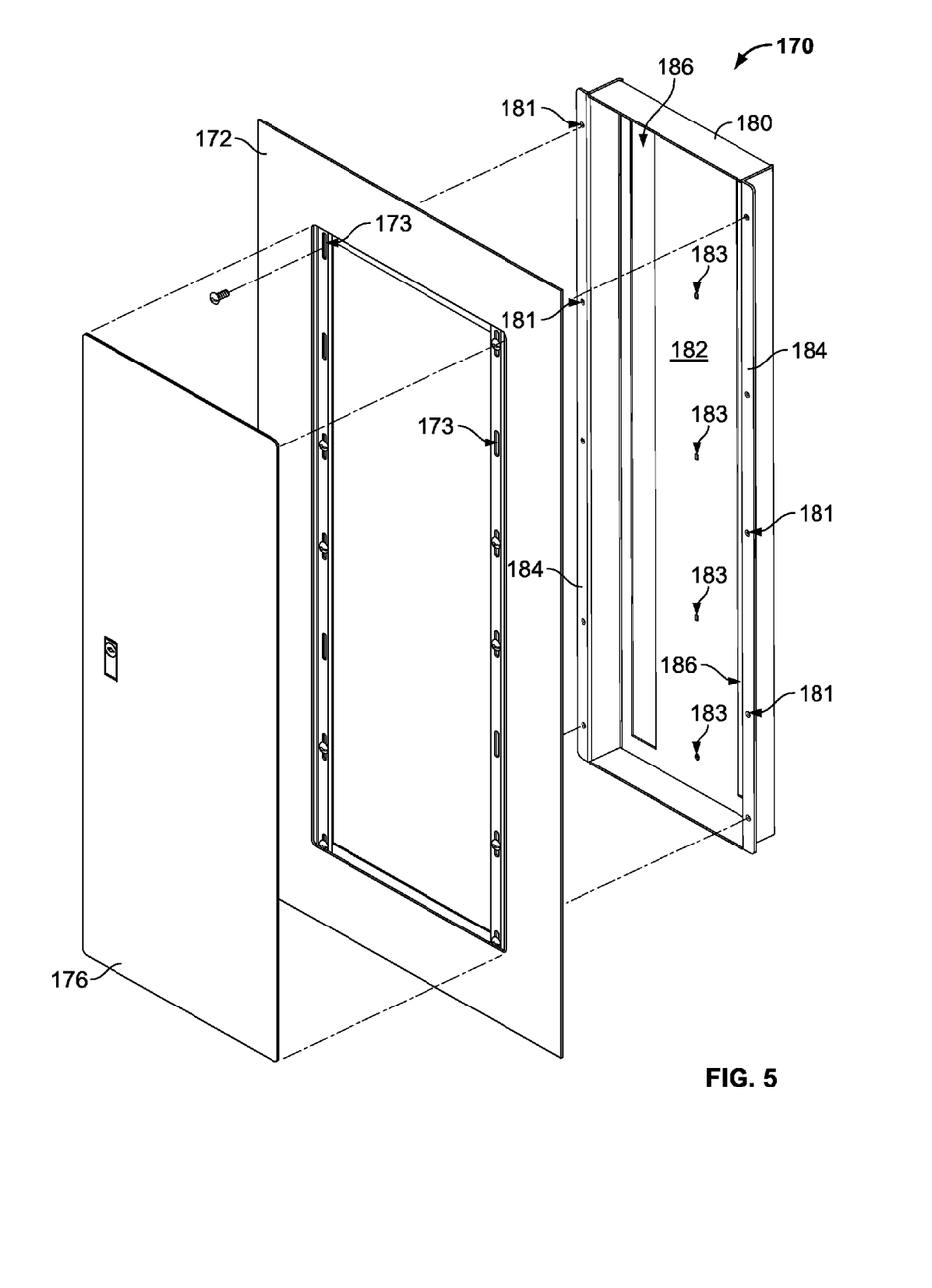
FIG. 5 is an exploded perspective view of the cover assembly of the emergency relay electrical enclosure of FIGS. 1 and 2.

Referring to FIG. 5, the cover assembly 170 includes a trim element 172, a door 176, and a deadfront 180. In the assembled configuration of the cover assembly 170 (FIG. 2), the door 176 is hingedly coupled to the trim element 172 for selectively providing access to the relays 135 within the housing assembly 110. The trim element 172 includes a plurality of slots 173 (FIG. 5) that align with a plurality of apertures 181 in the deadfront 180 for receiving fasteners therethrough that removably attach the trim element 172 to the deadfront 180.

The deadfront 180 includes a generally flat sheet portion 182 and two flange portions 184 that include the apertures 181. The generally flat sheet portion 182 of the deadfront 180 forms two openings 186 to provide access to (e.g., to view a status of) internal components (e.g., relays 135) of the emergency relay electrical enclosure 100. Further, the generally flat sheet portion 182 of the deadfront 180 includes a plurality of apertures 183 for receiving fasteners (not shown) to attach the deadfront 180 to the fifth wire barrier 155e of the relay pan assembly 130, thereby coupling the cover assembly 170 to the housing assembly 110 as shown in FIG. 1.

Figure 6:
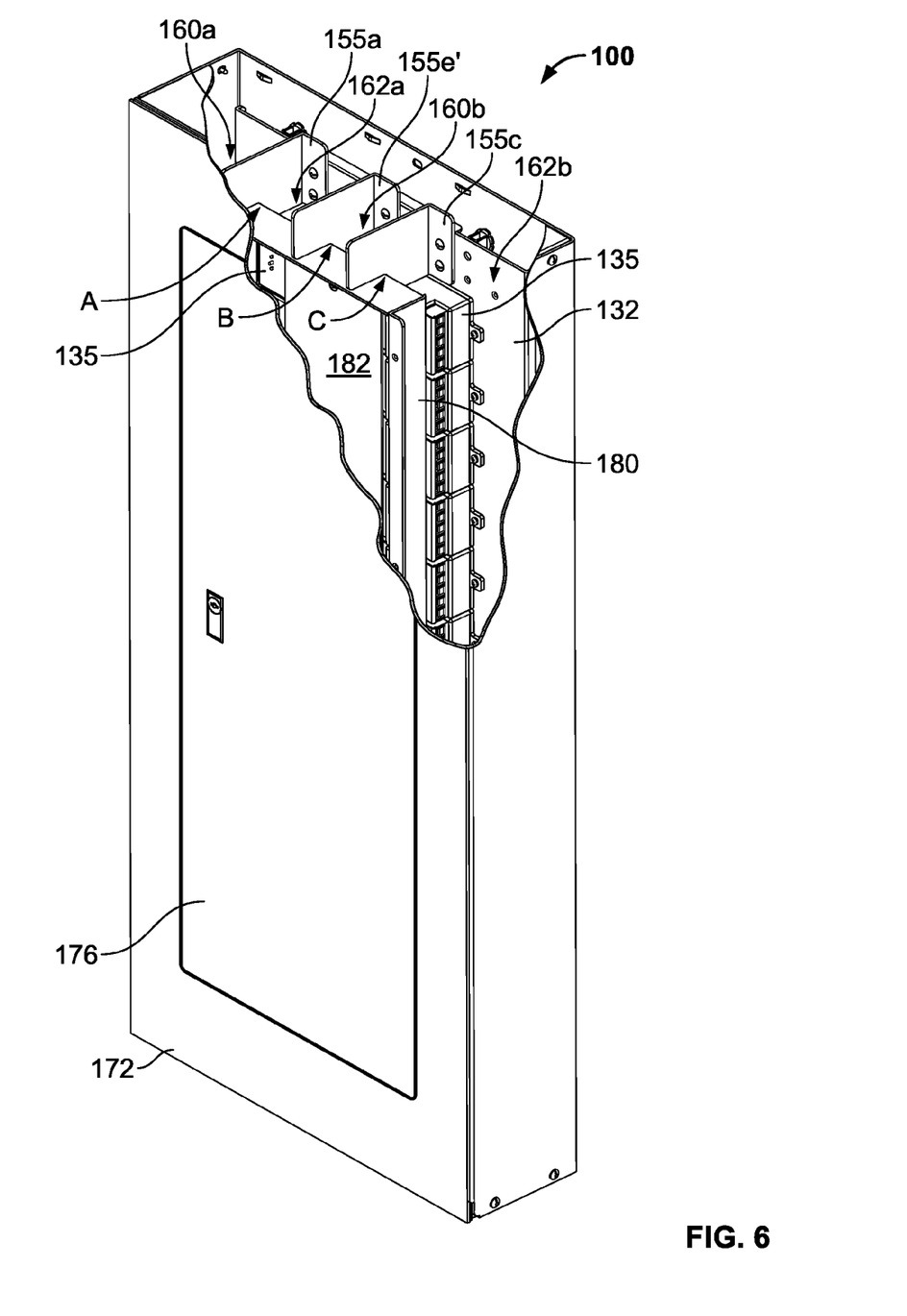
FIG. 6 is a partial cutaway perspective view of the emergency relay electrical enclosure of FIGS. 1 and 2 with a portion of the cover assembly cutaway to illustrate the four wire channels within the emergency relay electrical enclosure according to some aspects of the present disclosure.

When the cover assembly 170 is attached to the relay pan assembly 130 (as in FIG. 1), an internal surface of the generally flat sheet portion 182 of the deadfront 180 abuts a portion of each of the wire barriers 155a-e and/or a portion of the relays 135 attached to the relay mounting pan 132, which is best shown in FIG. 6 and indicated by arrows A, B, and C. As such, the deadfront 182 aids in sealing and/or forming the first and the second emergency wire channels 160a,b and the first and the second utility wire channels 162a,b when the cover assembly 170 is attached to the relay pan assembly 130.

Figure 4D:
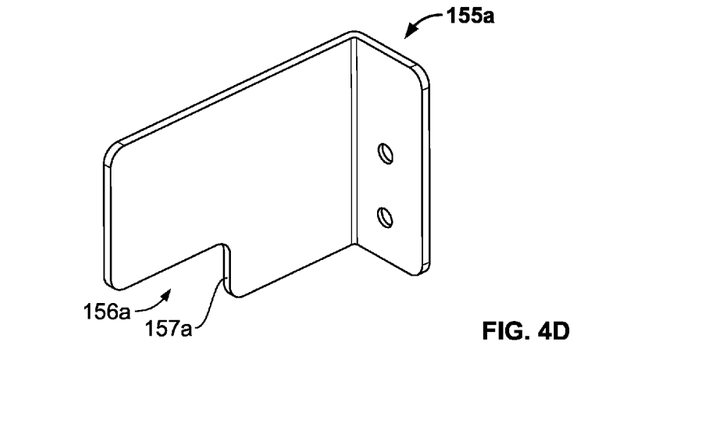
FIG. 4D is an enlarged view of the wire barrier of the relay pan assembly of FIG. 4A.

Specifically, all of the wire barriers 155a-d and both of the fin portions 155e' and 155e" of the fifth wire barrier 155e include a notch that forms an edge that abuts the internal surface of the generally flat sheet portion 182 of the deadfront 180. For example, as best shown in the enlarged view of the first wire barrier 155a in FIG. 4D, the first wire barrier 155a includes a notch 156a that forms an edge 157a.

The abutting engagement of the deadfront 180 with the relays 135 and with the edges (e.g., edge 157a) of the wire barriers 155a-e aids in preventing (i) emergency wires (not shown) in the first emergency wire channel 160a from migrating or moving into the first utility wire channel 162a, (ii) utility wires (not shown) in the first utility wire channel 162a from migrating or moving into the first or the second emergency wire channels 160a,b, (iii) emergency wires (not shown) in the second emergency wire channel 160b from migrating or moving into the first or the second utility wire channels 162a,b, and (iv) utility wires (not shown) in the second utility wire channel 162b from migrating or moving into the second emergency wire channel 160b, thereby maintaining separation of emergency and utility power sources in the emergency relay electrical enclosure 100.

Figure 7:
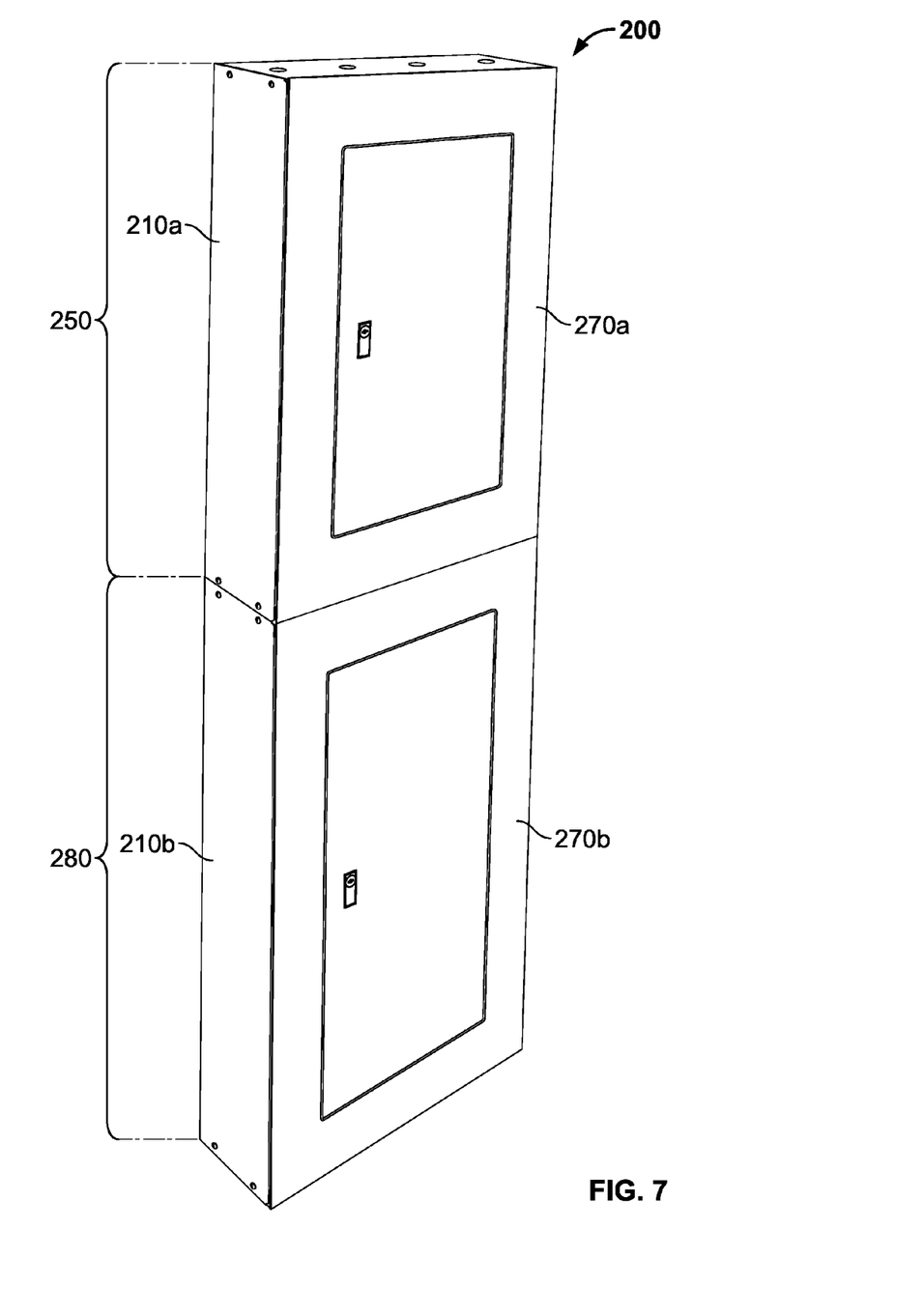
FIG. 7 is a perspective view of a combination emergency panelboard according to some aspects of the present disclosure.

Now referring to FIG. 7, a combination emergency panelboard 200 includes an upper housing assembly 210a that defines a relay section 250 of the combination emergency panelboard 200 and a lower housing assembly 210b that defines a circuit-breaker section 280 of the combination emergency panelboard 200. An upper cover assembly 270a is coupled to the upper housing assembly 210a such that the upper cover assembly 270a seals the contents of the relay section 250 within the upper housing assembly 210a. Similarly, a lower cover assembly 270b is coupled to the lower housing assembly 210b such that the lower cover assembly 270b seals the contents of the circuit-breaker section 280 within the lower housing 210b.

The upper housing assembly 210a and the upper cover assembly 270a are the same as, or similar to, the housing assembly 110 and the cover assembly 170 of the emergency relay electrical enclosure 100 shown in FIGS. 1-6 and described above. Additionally, as shown in FIG. 8, the upper housing assembly 210a is coupled to a relay pan assembly 230 that is the same as, or similar to, the relay pan assembly 130 of the emergency relay electrical enclosure 100, where like reference numbers of the relay pan assembly 130 are used herein for like components of the relay pan assembly 230.

Figure 8:
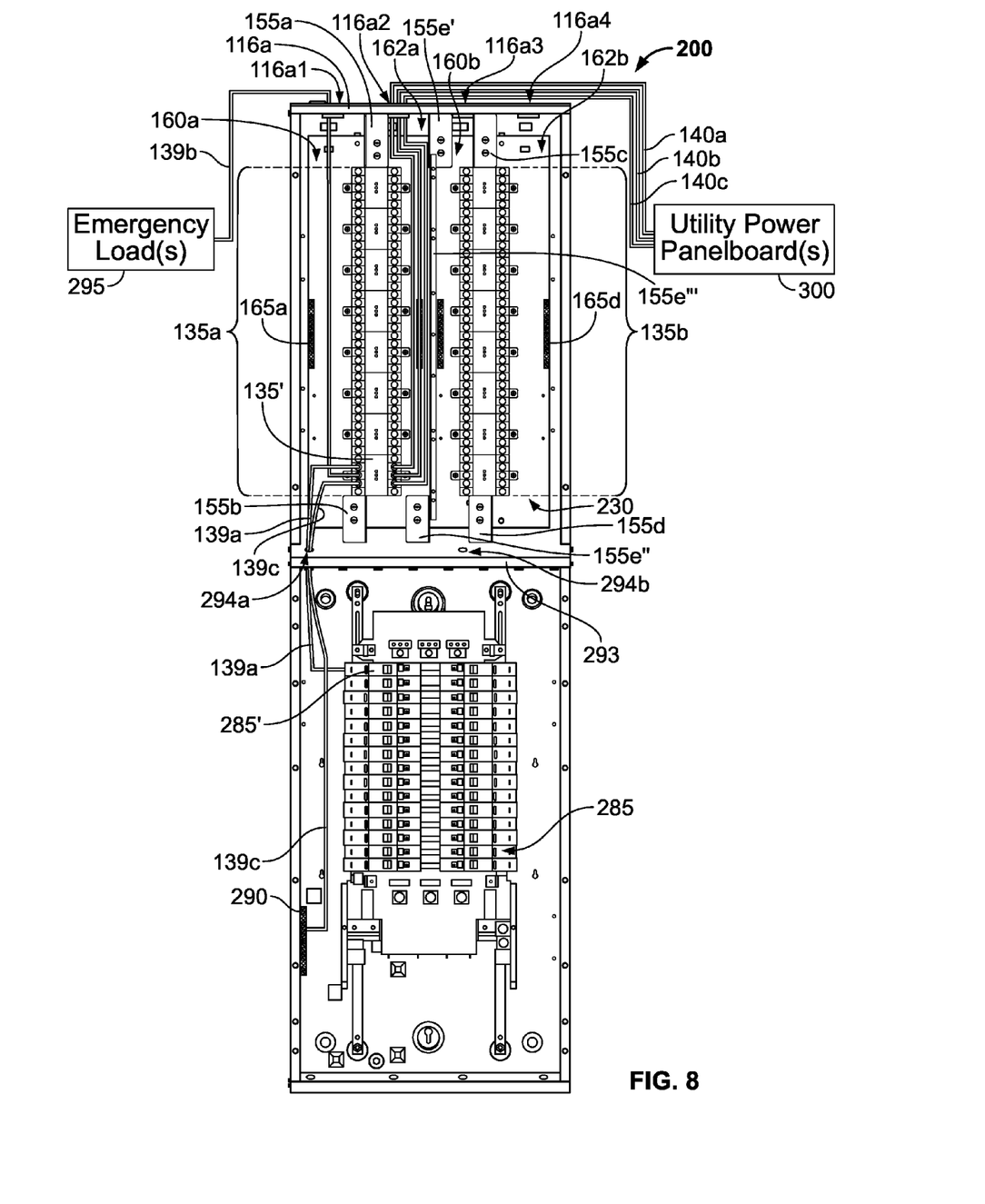
FIG. 8 is a front view of the combination emergency panelboard of FIG. 7 with the cover assembly removed to show some exemplary wire connections to a load and to a utility power panelboard.

Referring to FIG. 8, the upper and lower cover assemblies 270a,b of the combination emergency panelboard 200 are removed to illustrate the components therein. Specifically, the relay section 250 includes a first column of relays 135a, a second column of relays 135b, wire barriers 155a-e, and grounding bars 165a-d; and the circuit-breaker section 280 includes a plurality of emergency circuit breakers 285 and a neutral bar 290. The circuit-breaker section 280 also includes one or more busbars, positioned completely within the circuit-breaker section 280 of the lower housing assembly 210b, for distributing one or more phases of emergency current entering the combination emergency panelboard 200 to the plurality of emergency circuit breakers 285 coupled thereto.

The relay section 250 and the circuit-breaker section 280 are separated by a dielectric barrier or an insulation panel 293. The insulation panel 293 physically separates the contents of the relay section 250 from the contents of the circuit-breaker section 280. The insulation panel 293 is formed by a bottom end panel of the upper housing assembly 210a and an upper end panel of the lower housing assembly 210b. In some implementations, additional electrical and/or other types of insulation can be included in the insulation panel 293 (e.g., between the upper and lower housing assemblies 210a,b). Alternatively, the insulation panel 293 can be a unitary member that is positioned between the relay section 250 and the circuit-breaker section 280 and attached to the upper and lower housing assemblies 210a,b.

While the insulation panel 293 physically separates the contents of the relay section 250 from the contents of the circuit-breaker section 280, two apertures 294a,b are formed in the insulation panel 293 to provide access for electrical wires to be run between the relay section 250 and the circuit-breaker section 280. The first aperture 294a is positioned in and adjacent to the first emergency wire channel 160a and the second aperture 294b is positioned in and adjacent to the second emergency wire channel 160b such that separation of emergency current (in the emergency wire channels 160a,b and the circuit-breaker section 280) and utility current (in the utility wire channels 162a,b and the utility power panelboard 300) is maintained within the combination emergency panelboard 200.

Similarly, four apertures 116a1-4 are formed in an upper end panel 116a of the upper housing assembly 210a to provide access for electrical wires to be run from the relay section 250 to one or more emergency loads 295 and to one or more utility power panelboards 300. Specifically, the first aperture 116a1 is positioned in and adjacent to the first emergency wire channel 160a, the second aperture 116a2 is positioned in and adjacent to the first utility wire channel 162a, the third aperture 116a3 is positioned in and adjacent to the second emergency wire channel 160b, and the fourth aperture 116a2 is positioned in and adjacent to the second utility wire channel 162b, such that separation of emergency current (in the emergency wire channels 160a,b and the emergency loads 295) and utility current (in the utility wire channels 162a,b and the utility power panelboard 300) is maintained within the combination emergency panelboard 200.

With reference to the relay 135' at the bottom of the first column of relays 135a, several electrical wires are shown for electrically connecting the relay 135', in an exemplary fashion, to a first one of the emergency circuit breakers 285' in the circuit-breaker section 280, an emergency load 295 (e.g., an emergency lighting fixture), and a utility power panelboard 300 in the same, or similar, fashion that the relay 135, shown in FIG. 4C, is diagrammatically electrically connected to the emergency circuit breaker 191 in the emergency power panelboard 190, the emergency load 194, and the utility power panelboard 192.

Specifically, a first emergency power wire 139a electrically connects the relay 135' to an output lug of the first emergency circuit breaker 285' in the circuit breaker section 280 of the combination emergency panelboard 200 through the first aperture 294a in the insulation panel 293; a second emergency power wire 139b electrically connects the relay 135' to an input lug of the emergency load 295 through the first aperture 116a1 in the upper end panel 116a; and a third emergency power wire 139c electrically connects the relay 135' to the neutral bar 290 in the circuit-breaker section 280 through the first aperture 294a in the insulation panel 293.

Further, a first utility power wire 140a electrically connects the relay 135' to a constant hot output lug of a utility circuit breaker in the utility power panelboard 300 through the second aperture 116a2 in the upper end panel 116a; a second utility power wire 140b electrically connects the relay 135' to a switched output lug of the first utility circuit breaker in the utility power panelboard 300 through the second aperture 116a2; and a third utility power wire 140c electrically connects the relay 135' to a neutral bar in the utility power panelboard 300 through the second aperture 116a2.

While not shown for clarity purposes, similar electrical wires (e.g., wires 139a,b,c and 140a,b,c) can be attached to the other relays 135 in the first and the second columns of relays 135a,b while still maintaining the separation of emergency and utility current in the combination emergency panelboard 200.

While the base 112 is shown as being integral with the two side panels 114a,b, and the two end panels 116a,b are shown as being separate from the base 112 and/or the side panels 114a,b, in some implementations of the present disclosure, the base 112 can be integral with or separated from any of the side and/or end panels 114a,b and 116a,b.

While the cover assembly 170 is shown in FIG. 5 and described above as having a trim element 172 that is separate and distinct from the deadfront 180, the trim element 172 and the deadfront 180 can be an integral element. Additionally, while the deadfront 180 is shown and described as attaching to the fifth wire barrier 155e, the deadfront 180 and/or the trim element 172 can be coupled to the housing assembly 110 in a variety of other manners, such as, for example, the trim element 172 can be attached to one or more flanges of the end panels 116a,b and/or side panels 114a,b (not shown).

While the emergency relay electrical enclosure 100 and the combination emergency panelboard 200 are shown as including two columns of relays 135a,b, any number of columns of relays can be included (e.g., 1, 2, 3, 4, etc.) with a corresponding number of wire barriers to maintain the separation of emergency and utility current therein.

Alternatively to including the fifth wire barrier 135e to separate the first utility wire channel 162a and second emergency wire channel 160b, the emergency relay electrical enclosure 100 and/or the combination emergency panelboard 200 can be supplied without the fifth wire barrier 155e. However, to maintain the required separation of emergency and utility current therein, each of the relays 135 in the second column of relays 135b is rotated 180 degrees such that the utility wire connectors 138a of the relays 135 in second column of relays 135b are adjacent to the utility wire connectors 138a of the relays 135 in the first column of relays 135a and such that the emergency wire connectors 138b of the relays 135 in second column of relays 135b are adjacent to the second side panel 114b of the housing assembly 110. As such, only three wire channels are needed in such an alternative implementation. Specifically, the first emergency wire channel remains to the left of the first column of relays; however, the first and the second utility wire channels are positioned between the first and the second columns of relays such that the first utility wire channel is coincident with the second utility wire channel to form a shared utility wire channel; and the second emergency wire channel is flipped to the right side of the second column of relays. Of course, each of the first column of relays can be rotated 180 degrees such that the second utility wire channel remains to the right of the second column of relays; the first and the second emergency wire channels are positioned between the first and the second columns of relays such that the first emergency wire channel is coincident with the second emergency wire channel to form a shared emergency wire channel; and the first utility wire channel is flipped to the left side of the first column of relays.

In some alternative implementations, one or more of the relays in the first and/or the second columns of relays can be replaced with one or more dummy relays that aid in forming a contiguous barrier between the wire channels. The dummy relays can be of the same general size as the relays 135 or a smaller size (e.g., similar to the size of the wire barriers 155a-d.

Alternatively to the combination emergency panelboard 200 including the first and the second housing assemblies, the combination emergency panelboard 200 can include a single housing assembly with the insulation panel 293 attached thereto and physically separating the relay section 250 from the circuit-breaker section 280.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An emergency relay electrical enclosure, comprising:
   a housing having a base;
   a cover configured to be attached to the housing;
   a relay mounting pan mounted inside the housing;
   two or more automatic load control relays mounted to the relay mounting pan and arranged in a column, thereby forming a first column of relays; and
   a first wire barrier attached to the relay mounting pan adjacent to a first end of the first column of relays and a second wire barrier attached to the relay mounting pan adjacent to a second opposing end of the first column of relays, the first wire barrier and the second wire barrier being sized and shaped such that in response to the cover being attached to the housing, an internal surface of the cover abuts the first wire barrier and the second wire barrier thereby forming an emergency wire channel adjacent to a first side of the first column of relays and a utility wire channel separate from the emergency wire channel and adjacent to a second opposing side of the first column of relays.

2. The emergency relay electrical enclosure of claim 1, wherein the first wire barrier, the second wire barrier, and the first column of relays form a contiguous barrier that physically separates the emergency wire channel from the utility wire channel.

3. The emergency relay electrical enclosure of claim 2, wherein the first column of relays includes one or more dummy relays that aid in forming the contiguous barrier.

4. The emergency relay electrical enclosure of claim 1, wherein the relay mounting pan, the first wire barrier, and the second wire barrier each includes an electrically insulating material.

5. The emergency relay electrical enclosure of claim 1 in combination with an emergency power panelboard, wherein each of the two or more automatic load control relays is configured to be electrically connected to a respective emergency circuit breaker disposed in the emergency power panelboard such that each of the automatic load control relays is configured to distribute a phase of emergency current to a respective load.

6. The emergency relay electrical enclosure of claim 5 in combination with the emergency power panelboard, wherein
   (i) each of the two or more automatic load control relays is configured to be selectively controlled to supply or not supply the phase of emergency current to the respective load during normal operating conditions, and
   (ii) in response to the occurrence of an emergency event, each of the two or more the automatic load control relays are configured to automatically supply the emergency current to the respective load without regard to the selection to supply or not supply the phase of emergency electricity of (i).

7. The emergency relay electrical enclosure of claim 5 in combination with the emergency power panelboard, wherein a first end panel of the housing of the emergency relay electrical enclosure is coupled to a housing of the emergency power panelboard.

8. The emergency relay electrical enclosure of claim 7 in combination with the emergency power panelboard, wherein the first end panel of the housing of the emergency relay electrical enclosure includes an aperture adjacent to the emergency wire channel such that emergency power wires are configured to be run from the emergency circuit breaker disposed in the emergency power panelboard, through the aperture, along at least a portion of the emergency wire channel, and to one of the two or more automatic load control relays.

9. The emergency relay electrical enclosure of claim 5 in combination with a utility power panelboard, wherein each of the two or more automatic load control relays is further configured to be electrically connected to a respective utility circuit breaker disposed in the utility power panelboard such that each of the automatic load control relays is configured to monitor a voltage across the respective utility circuit breaker.

10. The emergency relay electrical enclosure of claim 1, wherein each of the two or more automatic load control relays is:
    (i) electrically connected to an emergency circuit breaker disposed in an emergency power panelboard, via a respective emergency power wire, for distributing a phase of emergency current to a respective load, a portion of the respective emergency power wire positioned within the emergency relay electrical enclosure being completely positioned within the emergency wire channel; and
    (ii) electrically connected to a utility circuit breaker disposed in a utility power panelboard, via a respective utility power wire, for monitoring a voltage of the respective utility circuit breaker, a portion of the respective utility power wire positioned within the emergency relay electrical enclosure being completely positioned within the utility wire channel.

11. The emergency relay electrical enclosure of claim 1, further comprising a first grounding bar attached to the relay mounting pan in the emergency wire channel and a second grounding bar attached to the relay mounting pan in the utility wire channel.

12. The emergency relay electrical enclosure of claim 1, wherein the cover includes a trim member, a door hingedly coupled to the trim member, and a deadfront attached to the trim member, the deadfront including the internal surface of the cover that abuts the first wire barrier and the second wire barrier thereby forming the emergency wire channel and the utility wire channel, the deadfront including an opening to provide access to a portion of each of the two or more automatic load control relays.

13. The emergency relay electrical enclosure of claim 1, further comprising:
    a second column of relays mounted to the relay pan adjacent to the first column of relays; and
    a third wire barrier attached to the relay mounting pan adjacent to a first end of the second column of relays and a fourth wire barrier attached to the relay mounting pan adjacent to a second opposing end of the second column of relays, the third wire barrier and the fourth wire barrier being sized and shaped such that in response to the cover being attached to the housing, the internal surface of the cover abuts the third wire barrier and the fourth wire barrier thereby forming a second emergency wire channel adjacent to a first side of the second column of relays and a second utility wire channel adjacent to a second opposing side of the second column of relays.

14. The emergency relay electrical enclosure of claim 13, wherein the utility wire channel is coincident with the second utility wire channel to form a shared utility wire channel and the emergency wire channel and the second emergency wire channel are separate and distinct from one another.

15. The emergency relay electrical enclosure of claim 13, further comprising a fifth wire barrier attached to the relay mounting pan between the first column of relays and the second column of relays such that in response to the cover being attached to the housing, the internal surface of the cover abuts the first wire barrier, the second wire barrier, the third wire barrier, the fourth wire barrier, and the fifth wire barrier thereby forming the emergency wire channel adjacent to the first side of the first column of relays, the utility wire channel adjacent to the second opposing side of the first column of relays, the second emergency wire channel adjacent to the first side of the second column of relays, and the second utility wire channel adjacent to the second opposing side of the second column of relays, the utility wire channel and the second emergency wire channel being physically separated by the fifth wire barrier, the cover including a deadfront that is removably attached to the fifth wire barrier.

16. A combination emergency panelboard, comprising:
  a housing having a relay section and a circuit-breaker section, the relay section being configured to receive automatic load control relays, the circuit-breaker section being configured to receive a plurality of emergency circuit breakers;
  a dielectric barrier positioned within the housing and separating the relay section from the circuit-breaker section;
  a busbar, positioned completely within the circuit-breaker section of the housing, for distributing a phase of emergency current entering the emergency panelboard to the plurality of emergency circuit breakers coupled to the busbar; and
  a plurality of automatic load control relays, positioned completely within the relay section of the housing and electrically connected to respective ones of the plurality of emergency circuit breakers, for distributing the phase of emergency current to a respective load.

17. The combination emergency panelboard of claim 16, wherein the plurality of automatic load control relays is arranged in a column, thereby forming a first column of relays; the emergency panelboard further comprising a first wire barrier positioned within the relay section of the housing adjacent to a first end of the first column of relays and a second wire barrier positioned within the relay section of the housing adjacent to a second opposing end of the first column of relays, the first wire barrier and the second wire barrier being sized and shaped such that in response to a cover being attached to the housing, an internal surface of the cover abuts the first wire barrier and the second wire barrier thereby forming a first emergency wire channel adjacent to a first side of the first column of relays and a first utility wire channel separate from the first emergency wire channel and adjacent to a second opposing side of the first column of relays.

18. The combination emergency panelboard of claim 17, further comprising:
  a second column of relays positioned adjacent to the first column of relays and completely within the relay section of the housing and electrically connected to respective ones of the plurality of emergency circuit breakers, for distributing the phase of emergency current to a respective load; and
  a third wire barrier positioned within the relay section of the housing adjacent to a first end of the second column of relays and a fourth wire barrier positioned within the relay section of the housing adjacent to a second opposing end of the second column of relays, the third wire barrier and the fourth wire barrier being sized and shaped such that in response to the cover being attached to the housing, the internal surface of the cover abuts the third wire barrier and the fourth wire barrier thereby forming a second emergency wire channel adjacent to a first side of the second column of relays and a second utility wire channel adjacent to a second opposing side of the second column of relays.

19. The combination emergency relay electrical enclosure of claim 18, further comprising a fifth wire barrier positioned within the relay section of the housing between the first column of relays and the second column of relays such that in response to the cover being attached to the housing, the internal surface of the cover abuts the first wire barrier, the second wire barrier, the third wire barrier, the fourth wire barrier, and the fifth wire barrier thereby forming the first emergency wire channel adjacent to the first side of the first column of relays, the first utility wire channel adjacent to the second opposing side of the first column of relays, the second emergency wire channel adjacent to the first side of the second column of relays, and the second utility wire channel adjacent to the second opposing side of the second column of relays, the first utility wire channel and the second emergency wire channel being physically separated by the fifth wire barrier.

20. The combination emergency panelboard of claim 16, wherein each of the plurality of automatic load control relays is configured to be electrically connected to a respective utility circuit breaker disposed in a utility power panelboard, such that each of the plurality of automatic load control relays is configured to monitor a voltage across the respective utility circuit breaker.

* * * * *